Mar. 3, 1925.
W. J. PEELLE
PROCESS OF FORMING GASKETS
Filed March 6, 1923
1,528,263
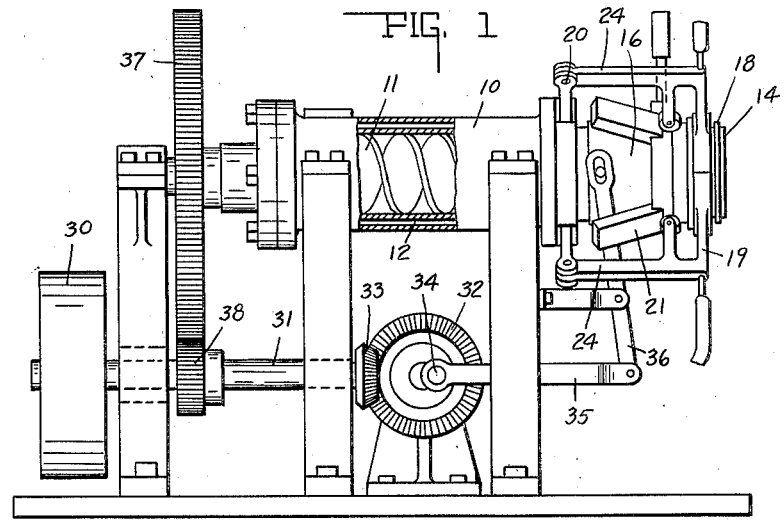
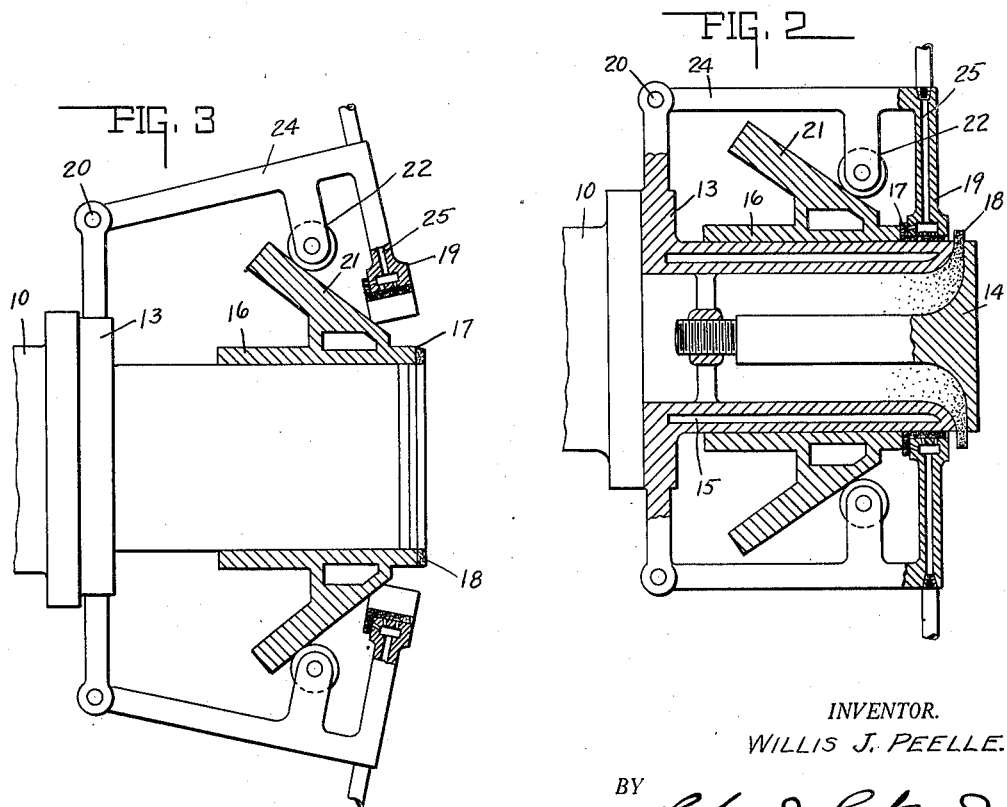
INVENTOR.
WILLIS J. PEELLE.
BY
ATTORNEYS.

Patented Mar. 3, 1925.

1,528,263

UNITED STATES PATENT OFFICE.

WILLIS J. PEELLE, OF CHICAGO, ILLINOIS.

PROCESS OF FORMING GASKETS.

Application filed March 6, 1923. Serial No. 623,103.

*To all whom it may concern:*

Be it known that I, WILLIS J. PEELLE, a citizen of the United States, and a resident of Chicago, county of Cook, and State of Illinois, have invented a certain new and useful Process of Forming Gaskets; and I do hereby declare that the following is a full, clear, and exact description thereof, reference being had to the accompanying drawings, in which like numerals refer to like parts.

This invention relates to the process of forming gaskets and the like from a mass of plastic gasket-forming material. In carrying out this process an annular laterally extending thin peripheral layer is extruded from a mass of rubber or rubber-like gasket-forming material in plastic condition, and the predetermined extruded portion is then severed to form a gasket or ring.

Another feature of the invention consists in applying suitable adhesive preventive material to the severed portion.

The full nature of the invention will be understood from the accompanying drawings and the following description and claims.

In the drawings, Fig. 1 is an elevational view of a machine embodying the principles of the invention by which the several process steps are accomplished, parts being broken way to show the means for extruding the rubber-like gasket forming material from the mass. Fig. 2 is an enlarged central sectional view of the die means associated with the mechanism illustrated in Fig. 1, and the severing or shearing means, and the means for applying adhesive preventive material thereto. Fig. 3 is a view similar to Fig. 2 but illustrates the parts thereof in the severing and adhesive preventive applying position.

In the drawings there is illustrated a machine described in Letters Patent issued to me on February 26, 1924, No. 1,484,961, whereby the various steps of the process are performed. A synopsis of the steps of the process for making sealing rings or gaskets comprises the extrusion of a predetermined portion of rubber-like material in a plastic condition from the mass and severing said predetermined extruded portion of said plastic material to form a gasket ring.

Another step in the process which permits said rings or gaskets to be packed or handled immediately thereafter consists in furnishing adhesive preventive material to the machine so that at least one side of the severed extruded portion or gasket will be covered by said preventive material.

The means for accomplishing the aforesaid steps in the process comprises a main reservoir 10, in which is positioned an extruding member, such as a screw 11 rotated by suitable means. As shown clearly in Fig. 1 the reservoir 10 is jacketed at 12, and suitable media is adapted to be received thereby to maintain the rubber like material, from which gaskets and sealing rings are to be made, in a plastic condition in said reservoir.

Positioned forwardly of the reservoir 10 is an adjustable die head, which head is provided with a conical disk head 14 adjustably supported thereby. The die head 13, if desired, is preferably jacketed at 15 so as to receive the same or similar media as used within the jacket means 12, so that said material within the reservoir and the die head will be maintained in a plastic condition.

The die head 13 is herein shown cylindrical in form, and a telescoping cylindrical sleeve member 16 is associated with said die head and is slidably supported thereon. The cylindrical member 16 is provided with a cutting face 17 which constitutes a shearing edge or severing means such that in the movement of the shearing sleeve member from the position shown in Fig. 2 to the position shown in Fig. 3, a portion of extruded material 18 will be severed from the mass and separated therefrom. From the foregoing explanation, it is obvious that as a mass of gasket-forming material is forced out of the head 13 in the thin extruded shape 18, it is extruded laterally of the cylinder head 13 and the disk 14 and beyond their peripheries, whereby reciprocatory movement of the shearing cylinder 16 will shear the extruded portion and form a gasket or sealing ring.

Associated with the mechanism hereinbefore described, and shown clearly in Figs. 2 and 3 are a plurality of arcuate sections pivotally supported at 20 and movable into and out of engagement with the cylindrical die head 13. The sections 19 are also adapted to engage the cutting face 17 of the shearing or severing sleeve 16.

The means for moving said parts in timed relation includes a cam 21 rigid with the sleeve 16 and a cam follower 22 supported by the supporting arm 24 which is pivotally supported at 20 and carries upon its free end the arcuate sections 19 hereinbefore mentioned. The arcuate section 19 is preferably provided with a suitable channel 25, whereby adhesive preventive material may be introduced through said arcuate section to the surfaces of the die head and the severing sleeve in such manner that said adhesive preventive material will be interposed between the shearing face 17 and the extruded portion 18, whereby at least one face of the gasket will be covered by said adhesive preventive material, and thus permit the sleeve 17 to be reciprocated without the extruded portion adhering thereto.

Said adhesive preventive material may be of several kinds and the invention is not limited to any particular kind of the same. When the gaskets, fashioned as described, are to be stored for subsequent use upon glass containers and the like, such as a Mason jar or other jars, the adhesive preventive material may be of talc powder or other similar material. When, however, as described in the copending application, Serial No. 419,373, a severed ring is to be secured immediately to the jar cover, the adhesive preventive material which is utilized preferably is water or soap suds, although any other or suitable means may be substituted therefor.

The means for actuating all of the foregoing means in timed relation with each other comprises a driving pulley 30, shaft 31 carrying the pinion 38 with which meshes a gear 37 for rotating the screw or extruder 11. The shaft 31 terminates in a bevel pinion 33 which meshes with a bevel gear 32. The bevel gear 32 carries on its face a crank pin 34 and a crank rod 35 which is pivotally supported at one end of a lever 36. The lever 36 has its other end connected to the shearing sleeve 16. Thus, as the sleeve 16 is projected forwardly to shear or sever the extruded ring 18 from the mass, the cam 21 removes the adhesive preventive applying means from the position shown in Fig. 2 into the position shown in Fig. 3, and in said forward movement of said shearing sleeve, the ring 18 is severed from the mass and the adhesive preventive material is applied to at least one face thereof.

By "lateral and circumferential extrusion," as herein used, is meant the extrusion of an annular rim or portion of the rubber-like material laterally and circumferentially of the mass of such material. If a die be used substantially as herein shown, such extruded portion would also be laterally and circumferentially of the die, being laterally of the center or axis of the die and circumferentially around the die.

The invention claimed is:

1. The process of forming sealing gaskets and the like including laterally and circumferentially extruding through suitable die means the required amount of rubber-like material from a plastic mass, and shearing said extruded material from said mass as it is extruded.

2. The process of forming sealing gaskets and the like including laterally and circumferentially extruding through suitable die means the required amount of rubber-like material from a plastic mass, shearing said extruded material from said mass as it is extruded, and applying an adhesive preventive material to the severed material as it is severed.

3. The process of forming sealing gaskets and the like including laterally and circumferentially extruding through a die means a gasket body of gasket-forming material from a plastic mass, severing said gasket body of extruded material for forming a gasket as it is extruded, and simultaneously applying adhesive preventive material to said extruded portion in the severing movement of the gasket and the like.

4. The process of forming a sealing gasket or the like including laterally and circumferentially extruding through suitable die means the required amount of gasket forming material from a plastic mass, and severing said extruded material from the plastic mass by a telescoping die as the material is extruded.

5. The process of forming a sealing gasket or the like including laterally and circumferentially extruding through suitable die means the required amount of gasket-forming material from a plastic mass, severing said extruded material from the plastic mass by a telescoping die as the material is extruded, and applying adhesive preventive material to the inner die means to be applied to the extruded portion of gasket-forming material in the severing movement thereof.

6. The process of forming a sealing gasket or the like including laterally and circumferentially extruding through suitable die means the required amount of gasket-forming material from a plastic mass, severing said extruded material from the plastic mass by a telescoping die as the material is extruded, and applying adhesive preventive material to the outer die means to be applied to the extruded portion of gasket-forming material in the severing movement thereof.

7. The process of forming a sealing gasket or the like including laterally and circumferentially extruding through suitable die means the required amount of gasket-forming material from a plastic mass, severing said extruded material from the plastic mass by a telescoping die as the material is extruded, and applying adhesive preventive material to the inner and outer die means to be applied to the extruded portion of gasket-forming material in the severing movement thereof.

8. The process of forming sealing gaskets and the like including heating gasket-forming material in a mass, circumferentially extruding a portion of said heating material from said mass to form a ring, severing said extruded ring-forming portion, and immediately applying an adhesive preventive material to said heated and extruded portion so that it will adhere thereto.

9. The process of forming sealing gaskets or the like including circumferentially extruding through said die means the required amount of gasket-forming material from the plastic mass by a telescoping die, and applying adhesive preventive material to the extruded portion of the gasket-forming material for separating the same from the die.

In witness whereof, I have hereunto affixed my signature.

WILLIS J. PEELLE.